United States Patent
Proca

(10) Patent No.: US 9,444,323 B2
(45) Date of Patent: Sep. 13, 2016

(54) POWER CONVERSION SYSTEM HAVING A HARMONIC DISTORTION LIMITER

(71) Applicant: Solidstate Controls, LLC, Columbus, OH (US)

(72) Inventor: Amuliu Bogdan Proca, Columbus, OH (US)

(73) Assignee: SOLIDSTATE CONTROLS, LLC, Columbus, OH (US)

( * ) Notice: Subject to any disclaimer, the term of this patent is extended or adjusted under 35 U.S.C. 154(b) by 30 days.

(21) Appl. No.: 14/601,330

(22) Filed: Jan. 21, 2015

(65) Prior Publication Data

US 2015/0207398 A1    Jul. 23, 2015

Related U.S. Application Data

(60) Provisional application No. 61/930,157, filed on Jan. 22, 2014.

(51) Int. Cl.
*H02M 7/5395* (2006.01)
*H02M 1/12* (2006.01)
*H02M 7/48* (2007.01)
*H02M 1/00* (2006.01)

(52) U.S. Cl.
CPC ............... *H02M 1/12* (2013.01); *H02M 7/48* (2013.01); *H02M 2001/0016* (2013.01); *H02M 2001/0025* (2013.01)

(58) Field of Classification Search
CPC ........... H02M 1/12; H02M 2001/123; H02M 1/4266; H02M 7/5395; H02M 1/32; H02M 3/33507; H02M 7/537; H02M 7/49; H02H 7/122; H02J 3/01

USPC .............................. 363/39–41, 50, 55, 95, 97
See application file for complete search history.

(56) References Cited

U.S. PATENT DOCUMENTS

| 5,327,335 A | 7/1994 | Maddali et al. |
| 6,295,215 B1 * | 9/2001 | Faria ........................ H02J 9/062 363/124 |

(Continued)

OTHER PUBLICATIONS

"Harmonic Distortion of the AC Power Line," White Paper, Danfoss Group, Copyright 2011, retrieved from www.danfossdrives.com Dec. 31, 2014.

(Continued)

*Primary Examiner* — Adolf Berhane
(74) *Attorney, Agent, or Firm* — Eley Law Firm Co, LPA; James R. Eley; Ronald J. Koch

(57) ABSTRACT

An electrical power conversion system having a harmonic distortion limiter. The power conversion system includes a power converter having a power input, a power output, a current measurement output signal, and a control signal input. The system further includes a controller having a voltage control subsystem arranged to measure a voltage present at the power output of the power converter and generate a corresponding current reference signal. A current control subsystem of the controller is arranged to receive the current reference signal and the current measurement output signal and generate a corresponding modulation command signal, the modulation command signal of the controller being electrically coupled to the control signal input of the power converter. The power converter is responsive to the modulation command signal to limit harmonic distortion at the power output of the power converter.

19 Claims, 3 Drawing Sheets

(56) References Cited

U.S. PATENT DOCUMENTS

| | | | |
|---|---|---|---|
| 9,065,325 B2* | 6/2015 | Sigamani | H02M 7/06 363/34 |
| 2010/0277139 A1* | 11/2010 | Huang | H05B 41/3928 323/234 |
| 2011/0255307 A1 | 10/2011 | Kim et al. | |
| 2013/0077362 A1* | 3/2013 | Kumar | H02M 1/4225 363/49 |
| 2013/0155732 A1 | 6/2013 | Wagoner et al. | |
| 2013/0322122 A1* | 12/2013 | Sigamani | H02M 1/4225 363/13 |
| 2014/0218990 A1* | 8/2014 | Ku | H02M 1/4225 363/126 |
| 2015/0117074 A1* | 4/2015 | Miao | H02M 1/4225 363/44 |
| 2015/0146458 A1* | 5/2015 | Lim | H02M 1/4225 363/44 |
| 2015/0349649 A1* | 12/2015 | Zane | H02M 3/33507 363/21.03 |

OTHER PUBLICATIONS

European Search Report, Application EP15152082 mailed Jul. 16, 2015.

* cited by examiner

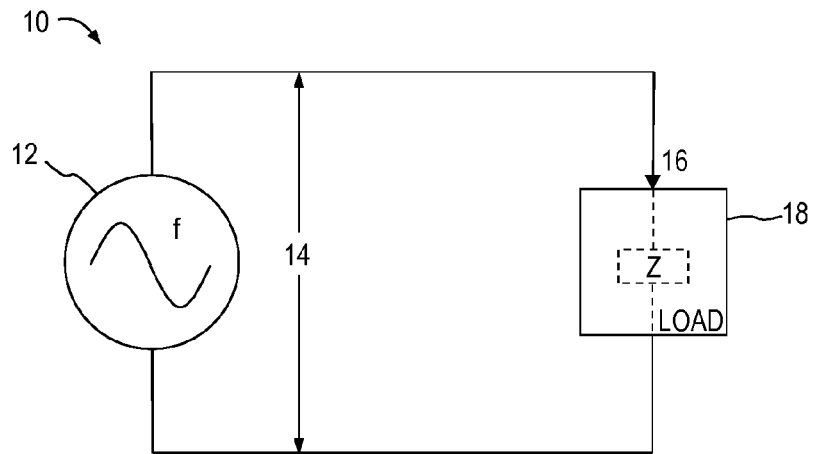
Fig. 1
*Prior Art*
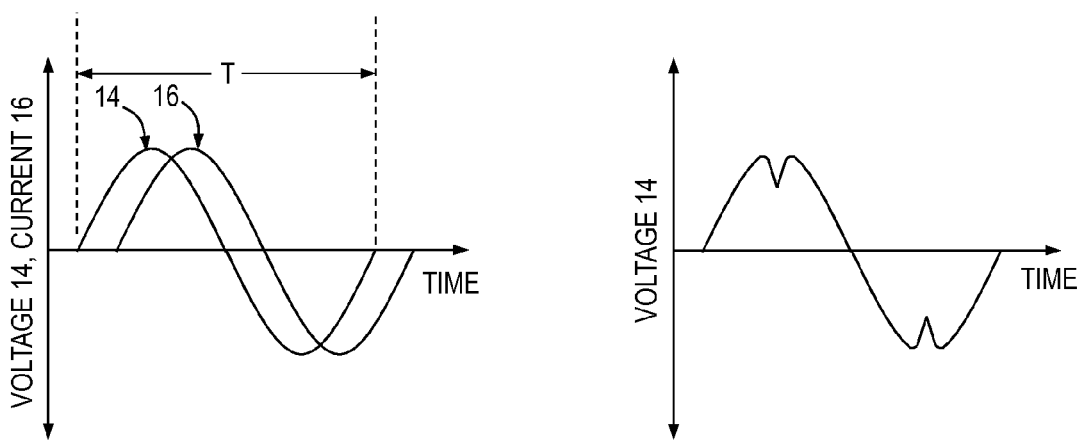
Fig. 2
*Prior Art*
Fig. 3
*Prior Art*

POWER CONVERSION SYSTEM HAVING A HARMONIC DISTORTION LIMITER

This application claims priority to U.S. provisional application 61/930,157, filed Jan. 22, 2014, the contents of which are hereby incorporated by reference.

FIELD

The present invention relates generally to systems and methods to reduce harmonic distortion in power converters, such as inverters used in uninterruptible power supplies (UPS).

BACKGROUND

The total harmonic distortion (THD) of an electrical signal is a measurement of the amount of unwanted harmonic frequencies that are present in the electrical signal. A typical power system 10, shown in FIG. 1, includes a power source 12 generating a sinusoidal alternating current (AC) voltage 14 and current 16 at a fundamental frequency "f" (or time period "T"). A load 18 is electrically coupled to power source 12. If the impedance "Z" of load 18 is essentially a linear load with only a resistive component, voltage 14 and current 16 are generally sinusoidal, as shown in FIG. 2, and may have a phase difference among each other. However, if load 18 is non-linear the load can draw current 16 that is non-sinusoidal. For example, load 18 may be a switch-mode power supply that draws current in a non-sinusoidal manner. Because the waveform of the load current 16 is non-sinusoidal when the voltage 14 applied to the load is sinusoidal, the load is considered to be non-linear. Since the source voltage has generally a non-zero impedance, the deviation from a sine wave of current 16 will induce a distortion in voltage 14, as generally shown in FIG. 3.

As can be seen from FIG. 3, waveform distortions can drastically alter the shape of the sinusoid. The resulting complex wave is a composite of multiple harmonic waveforms called harmonics. Harmonics have frequencies that are integer multiples of the waveform's fundamental frequency "f." For example, given a 60 Hz fundamental waveform, the second, third, fourth and fifth harmonic components will be at 120 Hz, 180 Hz, 240 Hz and 300 Hz respectively. Thus, harmonic distortion is the degree to which a waveform deviates from its pure sinusoidal values as a result of the summation of all these harmonic elements. In contrast, an ideal sine wave has zero harmonic components, with no distortion of the sine wave.

Total harmonic distortion measurements may be utilized to characterize the power quality of electric power systems. THD is generally defined by Equation 1, below:

$$THD_f = \frac{\sqrt{V_2^2 + V_3^2 + V_4^2 + \ldots + V_n^2 + \ldots}}{V_1} \qquad \text{Equation 1}$$

where $V_n$ is the root-mean-square (RMS) voltage (V) of the $n^{th}$ harmonic and n=1 is the fundamental frequency (f). Stated another way, THD is the ratio of the square root of the sum of the squares of the harmonic components to the root mean square of the component at the fundamental frequency.

Harmonic frequencies in the power grid are a frequent cause of power quality problems. Harmonics in power systems can result in increased heating in equipment and conductors that are coupled to the power system. In addition, harmonics can cause misfiring in variable speed drives and torque pulsations in rotating electrical machinery. In power systems, lower THD results in a reduction in peak currents, heating, emissions, and losses. Reduction of harmonics in power systems is thus desirable.

SUMMARY

The disclosed invention relates to control systems and techniques that are usable with power converters, such as single-phase uninterruptible power supplies, in order to reduce the harmonic distortion of the output voltage provided by the power converters. The disclosed invention allows for the cancellation of discrete harmonics (e.g., third, fifth, seventh, etc.) induced by a load coupled to the power converter, thereby reducing the total harmonic distortion of the power converter unit. The disclosed invention also allows for optimal voltage control (e.g., relatively fast transient response and substantially zero steady-state error) and for relatively fast current overload protection.

One aspect of the present invention is an electrical power conversion system having a harmonic distortion limiter. The power conversion system includes a power converter having a power input, a power output, a current measurement output signal, and a control signal input. The system further includes a controller having a voltage control subsystem arranged to measure a voltage present at the power output of the power converter and generate a corresponding current reference signal. A current control subsystem of the controller is arranged to receive the current reference signal and the current measurement output signal and generate a corresponding modulation command signal, the modulation command signal of the controller being electrically coupled to the control signal input of the power converter. The power converter is responsive to the modulation command signal to limit harmonic distortion at the power output of the power converter.

In one embodiment of the present invention an electrical power conversion system having a harmonic distortion limiter includes a power converter having a power input, a power output, a current measurement output signal, and a control signal input. A controller of the system includes a reference voltage and a voltage control subsystem. The voltage control subsystem has an error signal generator that is configured to generate a difference signal representing a difference between a voltage present at the power output of the power converter and the reference voltage, a first summation subsystem comprising sine and cosine products of the difference signal, and a second summation subsystem comprising sine and cosine products of harmonics of the power output. The voltage control subsystem generates a current reference signal. The controller further includes a current control subsystem that is arranged to receive the current reference signal and the current measurement output signal and generate a corresponding modulation command signal. The modulation command signal of the controller is electrically coupled to the control signal input of the power converter, the power converter being responsive to the modulation command signal to limit harmonic distortion at the power output of the power converter.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 1 is an electrical schematic diagram showing a typical sinusoidal alternating current power source and an electrical load connected thereto;

FIG. 2 shows a voltage and current waveform for the system of FIG. 1 for a linear load;

FIG. 3 shows the voltage waveform for the system of FIG. 1 for a non-linear load;

DETAILED DESCRIPTION

Figure 4:
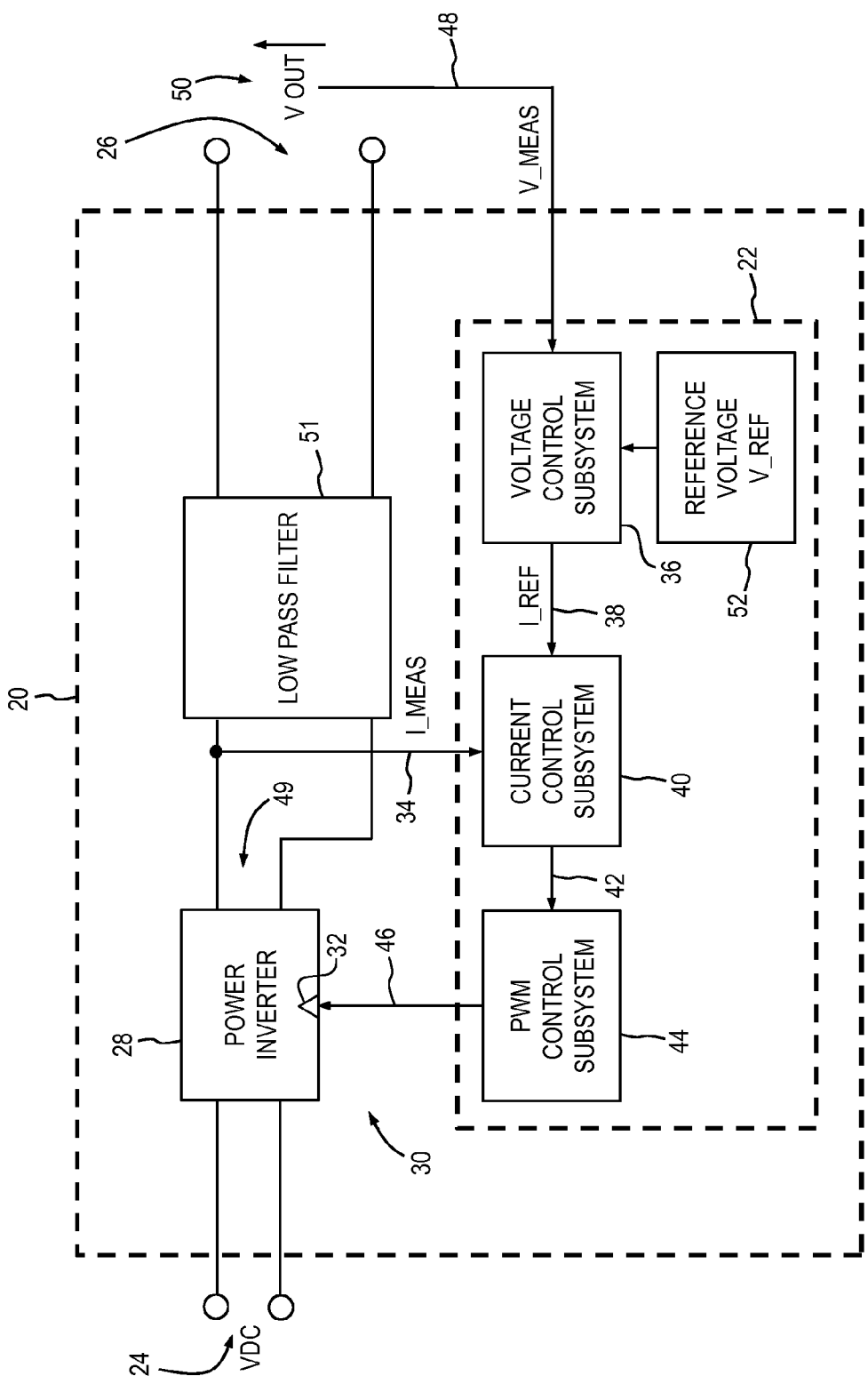
FIG. 4 is an electrical schematic diagram of a power converter and an associated controller according to an embodiment of the present invention.

The general arrangement of an electrical power converter system 20 having a controller 22 is shown in FIG. 4 according to an embodiment of the present invention. Controller 22 is configured as a closed-loop, output-regulated system with a harmonic distortion limiter to limit the total harmonic distortion of the power converter, as will be detailed further below. Power converter system 20 includes a power input 24 and a power output 26.

Controller 22 includes a dual feedback loop arrangement for a power inverter 28 of a power converter 30, which may form a portion of an uninterruptible power supply (UPS). Power converter 30 may include provision for a control signal input 32 and a current measurement output signal 34.

A first, outer feedback loop includes a voltage control subsystem 36 that generates a current reference signal "I_Ref" 38 for a second, inner feedback loop. The inner feedback loop includes a current control subsystem 40 that generates a modulation command signal 42 for a pulse-width modulation (PWM) control subsystem 44, which in turn controls the operation of power inverter 28 with a PWM control signal 46 that is electrically coupled to control signal input 32.

Controller 22 is a closed-loop feedback system that monitors output characteristics of power converter 30 and adjusts the operating characteristics of inverter 28 to maintain the output of the power converter in a predetermined manner, as detailed below.

Power inverter 28 is coupled to power input 24, which is in turn coupled to a not-shown direct current (DC) power supply. Power inverter 28 converts the DC voltage to an alternating current (AC) voltage having a predetermined voltage and frequency. The DC input voltage, output AC voltage and frequency, and overall power handling are selected for suitability for the requirements of power converter system 20 in a particular application. The circuit configuration of power inverter 28 may be any type of DC-AC inverter now known or later developed. Preferably, the output characteristics of power inverter 28 are adjustable by varying the characteristics of a PWM control signal that is electrically coupled to control signal input 32.

Voltage control subsystem 36 is coupled to power output 26 and receives a voltage measurement signal 48 ("V_MEAS") representing the output of power converter system 20. Voltage control subsystem 36 generates as an output current reference signal 38 ("I_Ref"), as discussed in detail below.

Current control subsystem 40 receives current reference signal 38 and compares the current reference signal to current measurement output signal 34. Current control subsystem 40 generates as an output modulation command signal (interchangeably, "modulation signal") 42.

Pulse width modulation control subsystem 44 receives modulation signal 42 and converts it to a PWM control signal (interchangeably, "PWM gate vector signal") 46. PWM gate vector signal 46 is output from PWM control subsystem 44 and provided to input 32 of power inverter 28. PWM gate vector signal 46 is used by power inverter 28 to turn on/off the switching elements (not shown) of inverter 28. As a result, a PWM power signal 49 is generated by modulating power input 24. A low pass filter 51 receives PWM power signal 49 and generates power output 26.

In operation, voltage control subsystem 36 samples output voltage measurement signal 48, which represents an output voltage 50 of the power converter 30. The difference (i.e., error) between measured voltage signal 48 and a predetermined reference voltage 52 ("V_Ref") is used by voltage control subsystem 36 to generate current reference signal 38 for current control subsystem 40.

Figure 5:
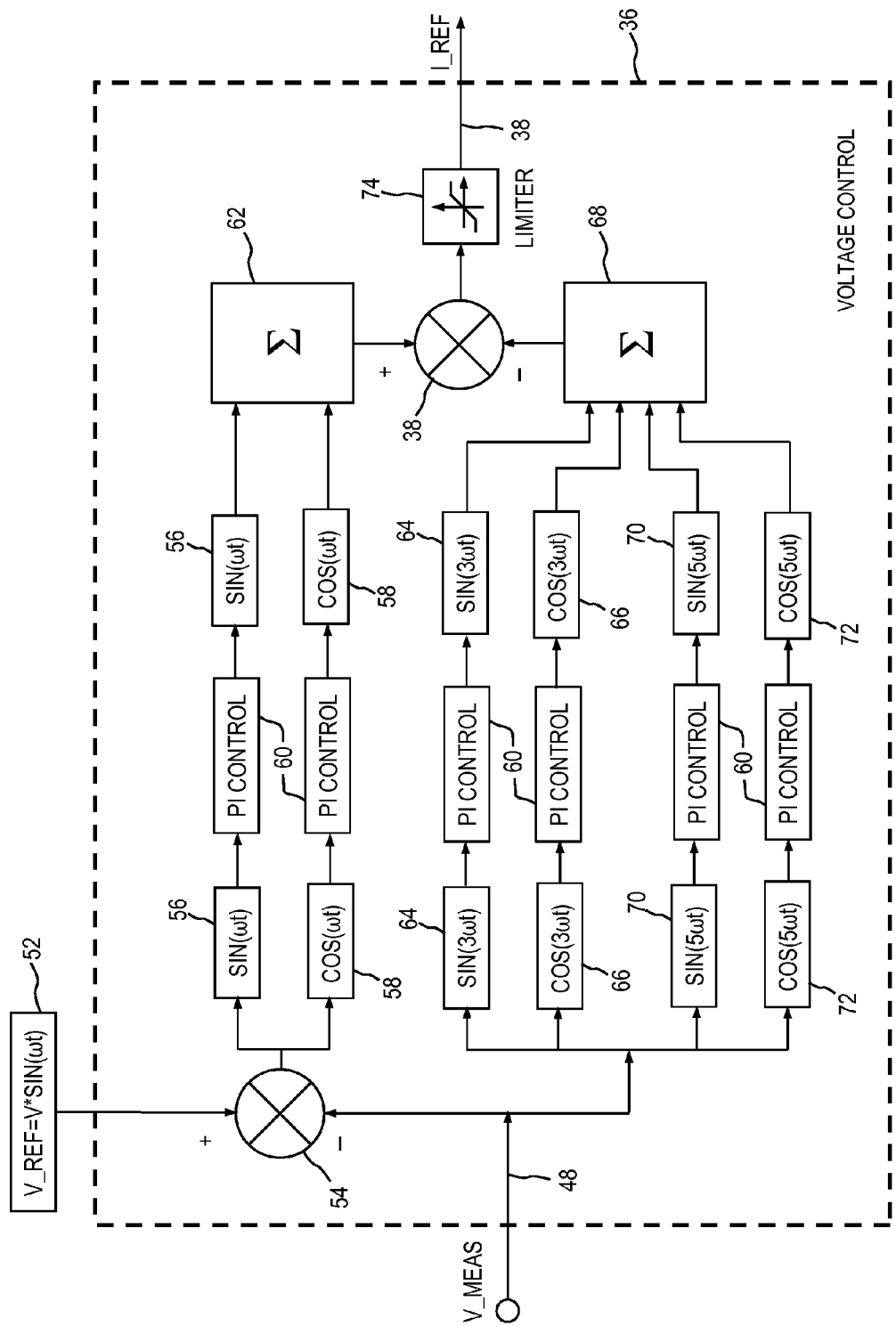
FIG. 5 is a block diagram of a voltage control subsystem of the controller of FIG. 4 according to an embodiment of the present invention.

Details of voltage control subsystem 36 are shown in FIG. 5. An error signal 54, comprising the difference between measured output voltage 48 and reference voltage 52, is multiplied with the sine of the phase of reference voltage 52 by a first sin(ωt) multiplier 56. Error signal 54 is also multiplied with the cosine of the phase of reference voltage 52 by a first cos(ωt) multiplier 58. Each of these two products are passed through corresponding proportional-integral (PI) controls 60 and are again multiplied with corresponding second sin(ωt) and cos(ωt) multipliers 56, 58 respectively. The final product results are added together by a first summation subsystem 62.

In order to cancel individual harmonics, the measured output voltage 48 is multiplied with the sine and cosine of that harmonic's phase. Each of these products is passed though corresponding PI controllers and are again multiplied with the sine and cosine of the measured output voltage. The results are added together by a second summation subsystem.

For example, with continued reference to FIG. 5, output measurement signal 48 is multiplied with the sine and cosine of the third harmonic's phase by a first sin(3 ωt) multiplier 64 and a first cos(3 ωt) multiplier 66. Each of these two products are passed through corresponding proportional-integral controls 60 and are again multiplied with corresponding second sin(3 ωt) and cos(3 ωt) multipliers 64, 66 respectively. The final product results are added together by a second summation subsystem 68.

Likewise, output measurement signal 48 is multiplied with the sine and cosine of the fifth harmonic's phase by a first sin(5 ωt) multiplier 70 and a first cos(5 ωt) multiplier 72. Each of these two products are passed through corresponding proportional-integral controls 60 and are again multiplied with corresponding second sin(5 ωt) and cos(5 ωt) multipliers 70, 72 respectively. The final product results for the fifth harmonics are added together with the final product results for the third harmonics by second summation subsystem 68. Any number of harmonics may be similarly processed by voltage control subsystem 36 and added together by second summation subsystem 68 within the scope of the present invention.

The proportional-integral controls 60 are of the form described in Equation 2, below:

$$Y_{out} = K_p * X_{input} + K_i * \int X_{input} * dt \qquad \text{Equation 2}$$

in which Y output is the output signal, $X_{input}$ is the input signal to the control and $K_p$ and $K_i$ are the proportional and integral gains respectively. In some embodiments of the present invention the values of $K_p$ and $K_i$ are larger for the branches attached to multipliers 56 and 58 than the values of $K_p$ and $K_i$ attached to all the other multipliers (i.e., 64, 66, 70, 72).

As shown in FIG. 5, current reference signal 38 is generated by determining the difference (i.e., error) between the results of the aforementioned additions 62, 68.

A limiter 74 may be utilized to prevent overshoot of current reference signal 38 above preset limit values. The limits may be fixed, or may be made adjustable.

Referring again to FIG. 4, the current measurement signal "I_Meas" 34 and current reference signal 38 are provided to current control subsystem 40, which generates modulation command signal 42 for PWM control subsystem 44. Current control subsystem 40 is preferably a discrete time sliding mode control. The sliding mode control preferably has a one-sampling-step tracking speed, provided enough input is available. This insures relatively fast transient response such that the current of the inverter 28 tracks with minimal overshoot of the reference 38 generated by voltage control subsystem 36, thereby providing over-current protection for power output 26.

In some embodiments of the present invention PWM control subsystem 44 is preferably unipolar, thereby generating fewer higher-order harmonics than a conventional bipolar PWM for the same switching frequency.

In various embodiments the present invention may be implemented in the form of an electronic digital control, analog control, and a combination thereof. In addition, the present invention may be implemented utilizing integrated components, discrete components, and a combination thereof.

Furthermore, at least a portion of the present invention may be implemented utilizing a combination of hardware components and a predetermined set of instructions (e.g., software, firmware, etc.). For example, on each time sample, one or more processors may execute predetermined equations (e.g., calculate errors, multiply with all sine and cosine, add again) as shown in FIG. 5.

The control system and corresponding method disclosed herein reduces harmonic distortion while maintaining desirable features of a power converter, such as optimal voltage control (e.g., relatively fast transient response and substantially zero steady-state error) and relatively fast current overload protection.

As is apparent to one of skill in the art, the disclosed invention may also be generally thought of in terms of modulation and demodulation for signal processing. Considered this way, the modulation/demodulation generally represents the procedure of multiplying a variable with sine/cosine (modulation), executing the PI controllers, multiplying again with sine/cosine (demodulation) and adding the sub-components back into one.

While this invention has been shown and described with respect to a detailed embodiment thereof, it will be understood by those skilled in the art that changes in form and detail thereof may be made without departing from the scope of the claims of the invention.

What is claimed is:

1. An electrical power conversion system having a harmonic distortion limiter, comprising:
a power converter having a power input, a power output, a current measurement output signal, and a control signal input; and
a controller comprising:
a voltage control subsystem arranged to measure a voltage present at the power output of the power converter and generate a corresponding current reference signal, the voltage control subsystem further includes a first summation subsystem comprising sine and cosine products of a fundamental frequency of the power output and further including a second summation subsystem comprising sine and cosine products of harmonics of the power output; and
a current control subsystem arranged to receive the current reference signal and the current measurement output signal and generate a corresponding modulation command signal, the modulation command signal of the controller being electrically coupled to the control signal input of the power converter,
the power converter being responsive to the modulation command signal to limit harmonic distortion at the power output of the power converter.

2. The electrical power conversion system of claim 1 wherein the current reference signal comprises a difference value of the first and second summation subsystems.

3. The electrical power conversion system of claim 1, further including a predetermined reference voltage, the reference voltage being coupled to the voltage control subsystem.

4. The electrical power conversion system of claim 3 wherein the voltage control subsystem further includes an error signal generator electrically coupled to the power output and to the reference voltage, the error signal generator being configured to:
compare the voltage present at the power output of the power converter to the reference voltage, and
generate an error signal,
the first summation subsystem comprising sine and cosine products of the error signal.

5. The electrical power conversion system of claim 1 wherein the voltage control subsystem further includes:
a first sine multiplier and a second sine multiplier electrically coupled to the power output and configured to multiply sine products of a fundamental frequency of the power output;
a first proportional-integral control intermediate the first and second sine multipliers;
a first cosine multiplier and a second cosine multiplier electrically coupled to the power output and configured to multiply cosine products of the fundamental frequency of the power output; and
a second proportional-integral control intermediate the first and second cosine multipliers,
the second sine multiplier and the second cosine multiplier each being configured to provide multiplier signals to the first summation subsystem.

6. The electrical power conversion system of claim 1 wherein the voltage control subsystem further includes:
a third sine multiplier and a fourth sine multiplier electrically coupled to the power output and configured to multiply sine products of a select harmonic frequency of the power output;
a third proportional-integral control intermediate the third and fourth sine multipliers;
a third cosine multiplier and a fourth cosine multiplier electrically coupled to the power output and configured to multiply cosine products of the select harmonic frequency of the power output; and
a fourth proportional-integral control intermediate the third and fourth cosine multipliers, the fourth sine multiplier and the fourth cosine multiplier each being configured to provide multiplier signals to the second summation subsystem.

7. The electrical power conversion system of claim 6 wherein the select harmonic frequency is a third harmonic.

8. The electrical power conversion system of claim 6 wherein the select harmonic frequency is a fifth harmonic.

9. The electrical power conversion system of claim 1 wherein the voltage control subsystem further includes:
a third sine multiplier and a fourth sine multiplier electrically coupled to the power output and configured to multiply sine products of the third harmonic of the power output;
a third proportional-integral control intermediate the third and fourth sine multipliers;
a third cosine multiplier and a fourth cosine multiplier electrically coupled to the power output and configured to multiply cosine products of the third harmonic of the power output;
a fourth proportional-integral control intermediate the third and fourth cosine multipliers;
a fifth sine multiplier and a sixth sine multiplier electrically coupled to the power output and configured to multiply sine products of the fifth harmonic of the power output;
a fifth proportional-integral control intermediate the fifth and sixth sine multipliers;
a fifth cosine multiplier and a sixth cosine multiplier electrically coupled to the power output and configured to multiply cosine products of the fifth harmonic of the power output; and
a sixth proportional-integral control intermediate the third and fourth cosine multipliers,
the fourth sine multiplier, the fourth cosine multiplier, the sixth sine multiplier, and the sixth cosine multiplier each being configured to provide multiplier signals to the second summation subsystem.

10. The electrical power conversion system of claim 1 wherein the current reference signal is limited to prevent overshoot beyond a predetermined limit value.

11. The electrical power conversion system of claim 1 wherein the current control subsystem is a discrete time sliding mode control.

12. The electrical power conversion system of claim 1 wherein the voltage control subsystem and the current control subsystem form a dual feedback loop arrangement.

13. The electrical power conversion system of claim 1, further including a pulse width modulation control subsystem electrically intermediate the modulation command signal and the control signal input of the power converter.

14. An electrical power conversion system having a harmonic distortion limiter, comprising:
a power converter having a power input, a power output, a current measurement output signal, and a control signal input; and
a controller comprising:
a reference voltage;
a voltage control subsystem including:
an error signal generator configured to generate a difference signal representing a difference between a voltage present at the power output of the power converter and the reference voltage,
a first summation subsystem comprising sine and cosine products of the difference signal, and
a second summation subsystem comprising sine and cosine products of harmonics of the power output,
the voltage control subsystem generating a current reference signal; and
a current control subsystem arranged to receive the current reference signal and the current measurement output signal and generate a corresponding modulation command signal,
the modulation command signal of the controller being electrically coupled to the control signal input of the power converter,
the power converter being responsive to the modulation command signal to limit harmonic distortion at the power output of the power converter.

15. The electrical power conversion system of claim 14 wherein the harmonics include a third harmonic.

16. The electrical power conversion system of claim 14 wherein the harmonics include a third and a fifth harmonic.

17. A method for limiting harmonic distortion in an electrical power conversion system, comprising the steps of:
configuring a power converter with a power input, a power output, a current measurement output signal, and a control signal input; and
obtaining a controller comprising:
a voltage control subsystem arranged to measure a voltage present at the power output of the power converter and generate a corresponding current reference signal, the voltage control subsystem including a first summation subsystem comprising sine and cosine products of a fundamental frequency of the power output and further including a second summation subsystem comprising sine and cosine products of harmonics of the power output, and
a current control subsystem arranged to receive the current reference signal and the current measurement output signal and generate a corresponding modulation command signal,
the modulation command signal of the controller being electrically coupled to the control signal input of the power converter,
the power converter being responsive to the modulation command signal to limit harmonic distortion at the power output of the power converter.

18. The method of claim 17, further including the step of configuring the current control subsystem as a discrete time sliding mode control.

19. The method of claim 17, further including the step of electrically coupling a pulse width modulation control subsystem intermediate the current control subsystem and the control signal input of the power converter.

* * * * *